(12) United States Patent
Murata et al.

(10) Patent No.: US 9,244,901 B1
(45) Date of Patent: Jan. 26, 2016

(54) AUTOMATIC SPEECH TAGGING SYSTEM AND METHOD THEREOF

(75) Inventors: Kiyomi Murata, Omaha, NE (US); Steven John Schanbacher, Omaha, NE (US); Aaron Scott Fisher, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 1542 days.

(21) Appl. No.: 12/107,119

(22) Filed: Apr. 22, 2008

(51) Int. Cl.
*G06F 17/27* (2006.01)

(52) U.S. Cl.
CPC ..................................... *G06F 17/27* (2013.01)

(58) Field of Classification Search
CPC ....... G10L 15/00; G10L 15/06; G10L 15/063; G10L 15/08; G10L 15/22; G10L 15/24; G10L 15/26; G10L 2015/00; G10L 2015/06; G10L 2015/063; G10L 2015/0638; G10L 2015/08; G06F 17/27; G06F 17/2705; G06F 17/272; G06F 17/28
USPC .............. 704/9, 257, 254, 231, 251, 256, 235
See application file for complete search history.

(56) References Cited

U.S. PATENT DOCUMENTS

| | | | | |
|---|---|---|---|---|
| 5,806,034 A | * | 9/1998 | Naylor et al. | 704/256 |
| 6,912,499 B1 | * | 6/2005 | Sabourin et al. | 704/243 |
| 7,280,965 B1 | * | 10/2007 | Begeja et al. | 704/257 |
| 8,321,220 B1 | * | 11/2012 | Chotimongkol et al. | 704/257 |
| 2003/0083876 A1 | * | 5/2003 | Lin | 704/251 |
| 2006/0190253 A1 | * | 8/2006 | Hakkani-Tur et al. | 704/243 |
| 2007/0180135 A1 | * | 8/2007 | Kenrick et al. | 709/231 |
| 2009/0055184 A1 | * | 2/2009 | Hebert | 704/257 |
| 2010/0299590 A1 | * | 11/2010 | Gissler et al. | 715/239 |

* cited by examiner

*Primary Examiner* — Qi Han
(74) *Attorney, Agent, or Firm* — Raffi Gostanian

(57) ABSTRACT

A method, a computer readable medium, and a system for tagging Natural language application. In the method, utterances are analyzed using one or more rules, and a tag is assigned to the analyzed utterances based on the one or more rules. The analysis of the utterances may include determining a frequency of the utterances, and grouping the utterances by their determined frequency and their assigned tag. The frequency may represent a number of occurrences in natural language where the utterances share semantic meanings, for example. Further, the one or more rules may be prioritized, and each of the utterances may be analyzed using the prioritized rules. In this manner, meaning may be assigned to utterances such that groups of utterances may be tagged simultaneously.

20 Claims, 4 Drawing Sheets

AUTOMATIC SPEECH TAGGING SYSTEM AND METHOD THEREOF

CROSS REFERENCE TO RELATED APPLICATIONS

The present application is related to commonly assigned U.S. patent application Ser. No. 11/673,663, filed Feb. 12, 2007 and titled Automatic Speech Recognition Tuning Management, U.S. patent application Ser. No. 11/673,665, filed Feb. 12, 2007 and titled Automatic Speech Recognition Tagging, and U.S. patent application Ser. No. 11/673,667, filed Feb. 12, 2007 and titled Automatic Speech Recognition Reporting, the entire contents of each of which are incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to an Automatic Speech Recognition (ASR) system and method for recognizing and tagging a multitude of spoken strings of words, hereinafter known as utterances, as a single meaning within a natural language application. More particularly, and not by way of limitation, the present invention is directed to a system and method for assigning meaning to utterances such that groups of utterances may be tagged simultaneously.

In the related art, the creation and success of a natural language application may be tied to a speech recognition system's ability to understand a large list of transcribed utterances or sentences. The system must apply a complex set of rules referred to as semantic interpretation grammar. This grammar is based on a corpus which is tagged (a corpus is a collection of recorded utterances used for linguistic analysis). Therefore, before the grammar can be developed, each line in the corpus must be tagged. The Tagging process is performed by a subject matter expert (SME) who indicates the specific meaning of a sentence. For example, the sentence "I just received my bill today" could indicate "I want to pay my bill" in a bill payment context. In this example, the sentence would be tagged as "PAYBILL".

The Tagging process requires significant effort from the SME and grammar developers (together, commonly referred to as Taggers) primarily related to the mapping of utterances to specific meanings (semantics). As part of this effort, the Tagging process requires review of all possible combinations of utterances and assignment to a specific semantic upon which a natural language application can react.

The sample size of potential utterances that must be tagged can sometimes be too large for Taggers to process. Further, limiting the Tagging process to a single Tagger can lead to excessive time consumed in the Tagging process and/or an insufficient mapping between potential utterances and their associated semantic.

Therefore, what is needed is a collaborative solution that allows assigning meaning to utterances such that groups of utterances may be tagged simultaneously, thereby improving efficiency in the Tagging process.

SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a method for tagging Natural language application comprising: analyzing utterances using one or more rules; and assigning a tag to the analyzed utterances based on the one or more rules.

In the above aspect, the analysis of the utterances may include determining a frequency of the utterances, and grouping the utterances by their determined frequency and their assigned tag. The frequency may represent a number of occurrences in natural language where the utterances share semantic meanings, for example. Further, the one or more rules may be prioritized, and each of the utterances may be analyzed using the prioritized rules.

In another aspect, the present invention is directed to a computer readable medium comprising instructions for: analyzing utterances using one or more rules; and assigning a tag to the analyzed utterances based on the one or more rules.

In yet another aspect, the present invention is directed to a system for tagging Natural language application comprising: a memory, and a processor communicably coupled to the memory. In this aspect of the invention, the processor may analyze the utterances using one or more rules, and assign a tag to the analyzed utterances based on the one or more rules.

DETAILED DESCRIPTION OF THE INVENTION

Figure 1:
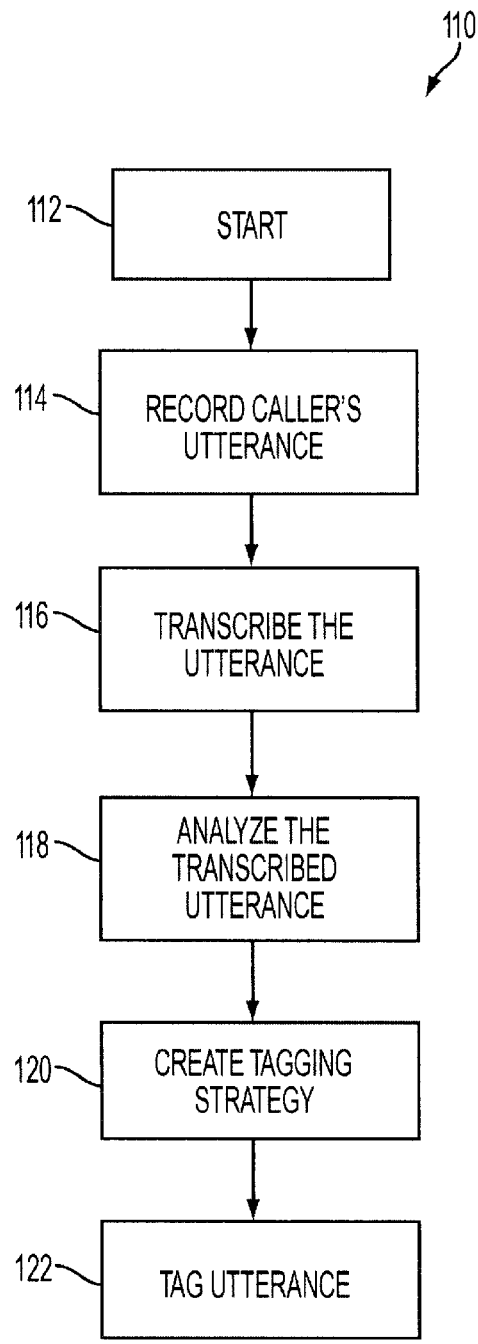
FIG. 1 illustrates an exemplary method of tagging Natural language application according to the present invention.

Referring to FIG. 1, a first exemplary embodiment 110 of a method of tagging Natural language application is depicted. FIG. 1 comprises a number of blocks or modules that may be embodied as software, hardware, firmware, or a combination thereof. In the first exemplary embodiment, the system may be started 112, and record 114 a callers utterance. The utterance may be transcribed 116 and the transcribed utterance analyzed 118. A tagging strategy may be created 120 and the utterance may be tagged 122 based on this strategy.

Figure 2:
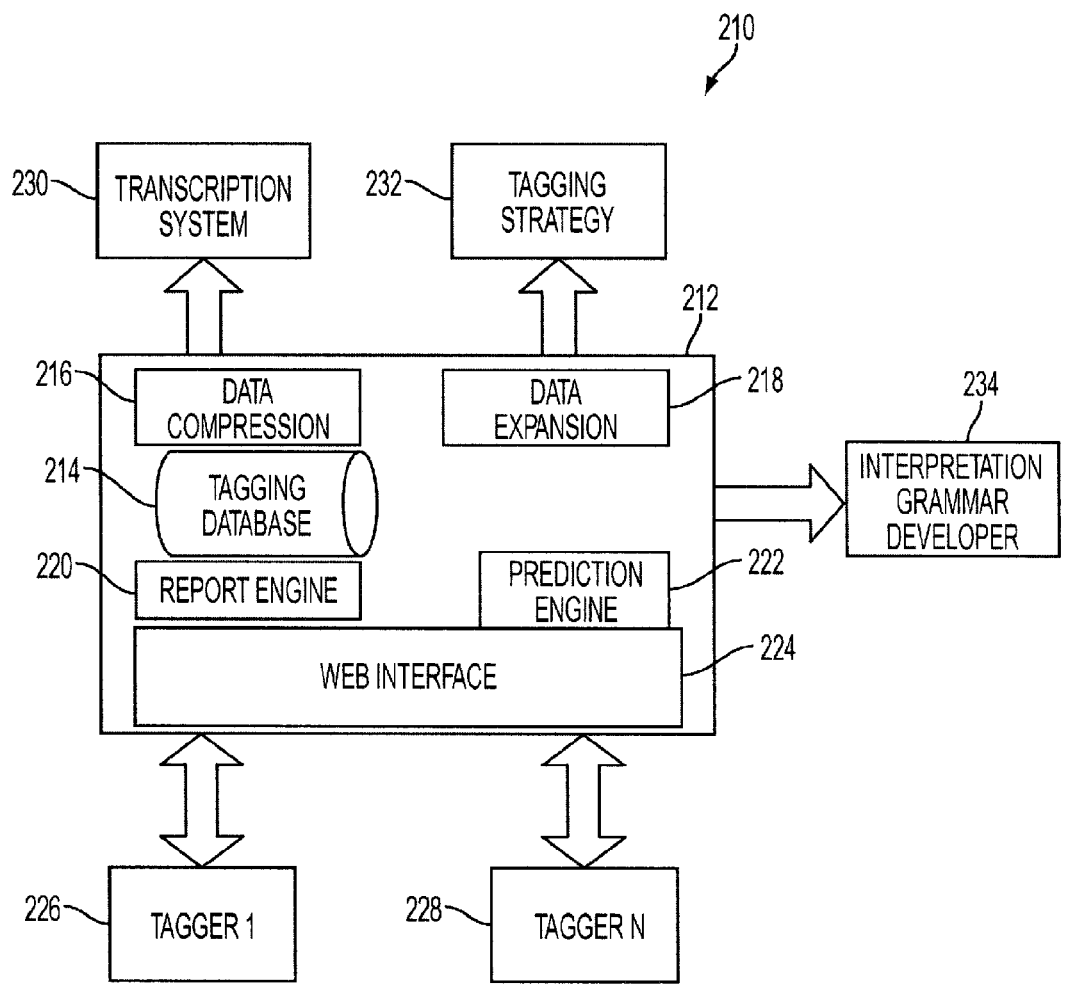
FIG. 2 illustrates an exemplary embodiment of a system used for tagging Natural language application according to the present invention.

Referring now to FIG. 2, a system of tagging Natural language application 210 is depicted. In FIG. 2, the blocks or modules shown may be embodied as software, hardware, firmware, or a combination thereof. The system exemplary embodiment may include a tagging server 212 which may have a tagging database 214. The tagging server 212 may compress 216 data and expand 218 data. The tagging server 212 may include a report engine 220, a prediction engine 222, and a web interface 224. The web interface 224 may be communicably coupled to tagging computers 226 and 228. A transcription system 230 and tagging strategy 232 may provide inputs to the tagging server 212. The output of the tagging server 212 may be used to develop interpretation grammar.

Figure 3:
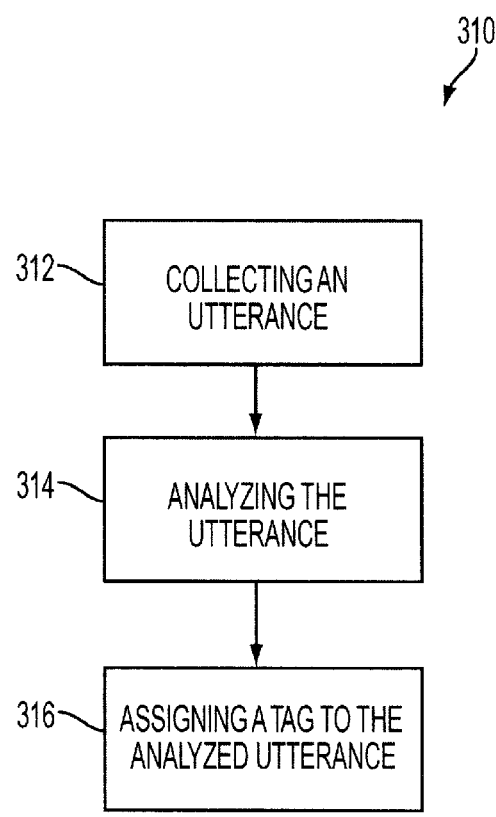
FIG. 3 illustrates another exemplary method of tagging Natural language application according to the present invention.

Referring now to FIG. 3, another exemplary method of tagging Natural language application 310 is depicted according to the present invention and may comprise a number of blocks or modules that may be embodied as software, hardware, firmware, or a combination thereof. In this embodiment, the method for tagging Natural language application 310 may comprise collecting 312 an utterance, analyzing 314 the utterance, and assigning 316 a tag to the analyzed utterance. The transfer of information may occur, for example, via a wireless protocol, a wired protocol or a combination thereof.

Figure 4:
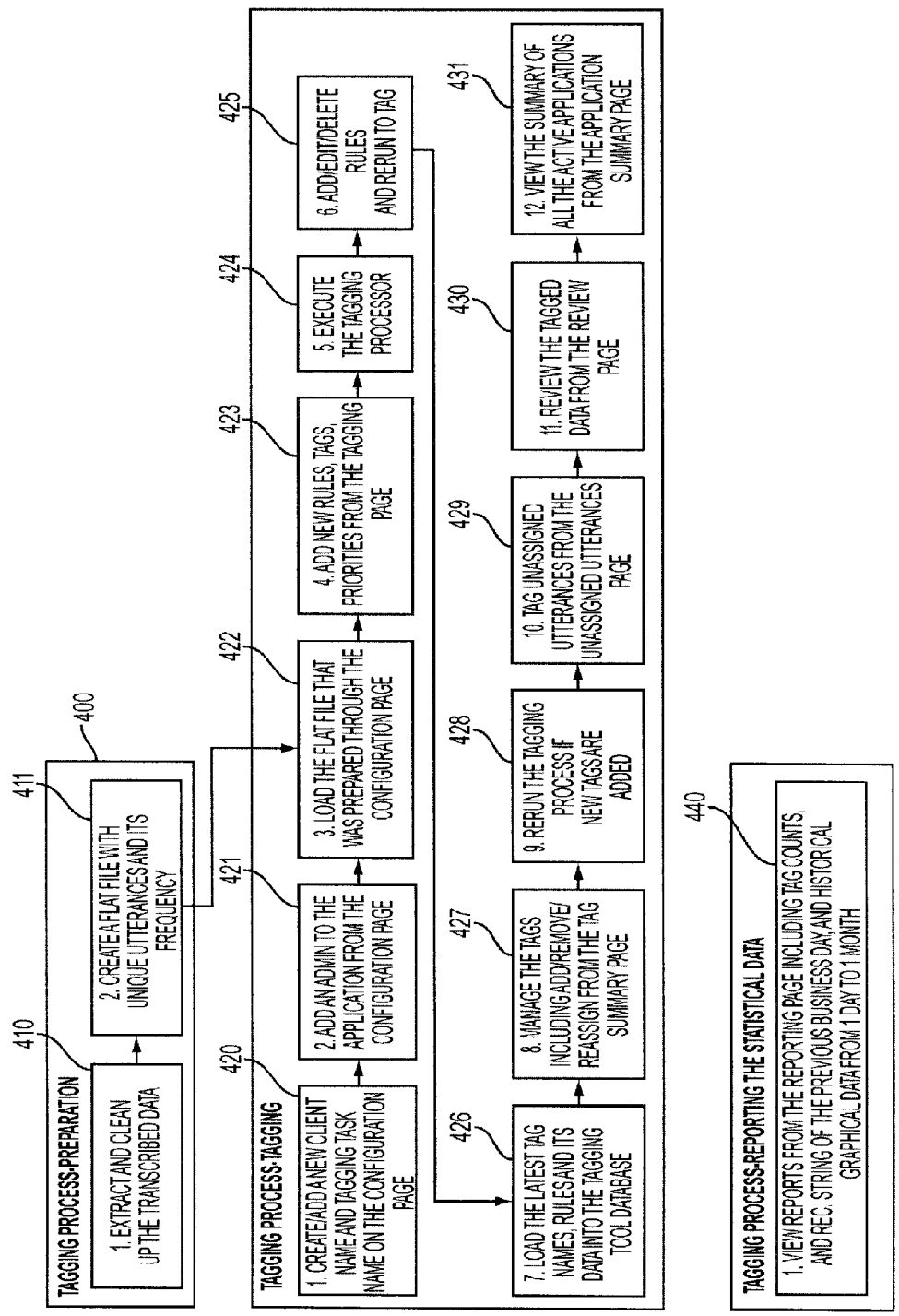
FIG. 4 illustrates yet another exemplary method of tagging Natural language application according to the present invention.

Referring now to FIG. 4, yet another exemplary method of tagging Natural language application 400 is depicted and comprises a number of blocks or modules that may be embodied as software, hardware, firmware, or a combination thereof.

In the method of FIG. 4, the tagging process may be broken into three phases. The first phase may include Preparation, the second phase may include the actual Tagging, and the third phase may include Reporting and Displaying the data derived from phases one and two.

In the Preparation phase, an utterance transcription may be compiled and subsequently, data from the transcription may be extracted 410 from the transcription database. During this step, the extracted data may be set and reviewed to identify potential issues such as spelling errors, alternate spelling (i.e. email, e-mail, e mail), etc.

In step 411, the data may then be compiled, and a flat file created which may include unique utterances and the frequency of such utterances. Further, in any phase of the method, reports may be generated and displayed. For example, in this step, a report may include the unique utterances for each tag, with the utterances sorted by frequency and displayed in descending order.

The Tagging phase of the method of the invention may be initiated in parallel or simultaneously with the Preparation phase. In step 420, a new client name and a name of the tagging task may be created or added on, for example, a Configuration page of a tagging tool. The tagging tool may be embodied as hardware, software, firmware, or a combination thereof. In this step, a job status may be automatically assigned as active.

In step 421, an administrator or operator may be assigned to the newly created tagging task initiated from the Configuration Page as discussed above.

Next, the flat file generated in step 411 may be loaded 422 into the tagging tool. The flat file may contain the unique utterances and the utterances' frequency.

In step 423, new rules may be developed and added to tags to search against the utterances. In this step, a priority of the rules may also be specified.

Next, a tagging processor of the tagging tool may be executed 424. Each utterance during this execution may be looped in the file using the rules by their priority. If a rule applies to an utterance, then the utterance may be tagged with the associated tag. The tagging process then moves on to the next utterance. If a rule does not apply to an utterance, the next rule is examined. If none of the rules apply to the utterance, the utterance may be left as "untagged".

At any point in this process, for example, after all the utterances have been processed, in the Reporting phase, the tagging tool may display 440 the tagging results. Each tag may be displayed, and all the utterances that were tagged for that tag may be displayed with, for example, frequency descending. Statistics may be provided for each tag. As an example, the display may include the percentage of the frequency to the total number of the utterances, and also the percentage of the total counts to the total number of the utterances.

In step 425, the current set of rules may be displayed. At this point, the operator or administrator may be allowed to add, edit, delete, and/or reorder the rules. Each rule may have three components: matching criteria, creating a tag, and assigning priority. Matching criteria is used to match rules to utterances. Matching criteria may consist of logical expressions, such as "and" or "or". Creating tag may be used to add a tag name that will be assigned to the utterance as the tagging process proceeds. Assigning priority may be used to rank the rules relative to other rules. This may allow more concise rules to be considered before ambiguous rules are examined.

Once a majority of the utterances are tagged using the tagging processor and the results are satisfactory, in step 426, the latest tag names and their rules may be loaded into the tagging tool database using, for example, an automated data loading process.

In step 427, new tag names may be added from a Tag Summary Page after the tagging process is completed. When a tag is removed, the tagging tool may search the tagged data and determine if the tag has any utterances assigned. If there are any tagged utterances, the tagging tool system may flag this data.

Existing rules for a selected tag may be moved to other existing tags, and the process rerun again to reassign the utterances to the other tags. Further, assigned tags to the utterances may be reassigned to another tag from a Review Page, if the selected utterances were unassigned to any tags from the tagging process. Once a tag that is being removed no longer has any utterances, the tag may be removed from the tagging tool.

Of course, it should be understood that if a new tag and rules are created, the tagging process may be rerun against either the complete or partial data set as shown in step 428.

In step 429, the unassigned utterances may be tagged from an Unassigned Utterances Page. At this point in the method of the invention, there should be relatively few unassigned utterances. The Unassigned Utterances Page may include features to select how many unassigned utterances that an operator wants to tag, and to choose a certain number of utterances to be displayed. Those data may be dedicated for the particular operator to tag. The counts of the unassigned utterances may be displayed on the Unassigned Utterances Page. If any data is assigned to a person, the Unassigned Utterances Page may show the counts of the unassigned utterances needed to be completed on the login page along side the application name.

In step 430, the tagged data may be reviewed from the Review Page. The operator may select the number of utterances to be displayed. Each utterance may have the choice of existing tag names to select if it needs to be reassigned.

Finally, in step 431 of the Tagging phase, the tagging tool may include an Application Summary Page and have a feature to display the summary by application including start and end dates of utterance collection, anticipated go live dates, total number of collected utterances, ranking of the tag counts per tag and its percentage of the collected data, and the top 100 utterances with counts based on the collected data.

As discussed above, the Reporting and Displaying phase may include displaying and reporting 440 statistical data determined during the tagging process. The statistical data may be made available through the Reporting Page. The data may include a ranking of the tag counts and their percentage based on the collected data. The display feature may show a ranking of the tag counts of the previous business day, a recognition string along with its tag and confidence level of the previous business day, and/or historical data of the tag counts in graphic mode to views trends. Any amount of data may be collected and displayed, for example, from one day to one month's worth of data may be kept.

In practice, the data may be extracted from a central log through an application developer's library that logs the data. The data may be tied with the application name from the tagging database. An Interactive Voice Response (IVR) application name may be entered in an app_detail table to match the name that the application uses. A nightly cron job may check the state of the jobs in a job_detail table, and run the reports to get the tag counts and recognition string information, and log the result in a separate file and archive that data. This may be used to view possible trends using the graphic mode.

In a tagging tool according to an exemplary embodiment of the invention, a display may show several pages, such as:

Login Page:

The Login Page may display, for example, all the active tagging applications, the assigned operators who are designated to tag the unassigned utterances, and how many unassigned utterances are left to complete. A List/Drop down menu of the inactive jobs may also be included. Further, a job status may be displayed and operable to be modified.

Application Summary Page:

The Application Login Page may display a summary by application, a start and end date of utterance collection, an anticipated go live date, a total number of collected utterances, a ranking of the tag counts per tag and its percentage of the collected data, and a top 100 utterances with counts based on the collected data.

Configuration Page:

A Configuration Page may include a feature to add a new client and application name. Once the application name is created, it may be assigned a job ID automatically. The Configuration Page may also include features to select a job status: active, inactive, testing or live. Also, the administrator of a newly created application may be assigned, and viewers/Taggers assigned. Finally, the Configuration Page may be used, for example, to load the tagged data into the database.

Tag Summary Page:

A Tag Summary Page may include features to display the tag names, the description of the tag, and some examples of the utterances that qualify for the tag.

Tagging Page:

A Tagging Page may include features to tag the utterances using the preprocessor concept.

Unassigned Utterances Page:

The Unassigned Utterances Page may include features to tag the remaining utterances that did not qualify (meet a rule) from the tagging process. These utterances may usually be single utterances that are left.

Review Page:

A Review Page may include features to review the tagging result from the tagging process. Features associated with the Review Page may include the ability to choose how many records (25, 50 like increments) are to be reviewed.

On the side of the utterances, there may be a drop down menu which is populated by the available tag names.

Reporting Page:

The Reporting Page may include features that show a ranking of the tag counts by tag and their frequency. Further, the features may include a recognition string by tag with confidence level and frequency, or graphical views of such data.

Systems, methods, devices and computer readable media have been shown and/or described in the above embodiments for tagging Natural language application. Although the above descriptions set forth exemplary embodiments, it will be understood that there is no intent to limit the invention by such disclosure, but rather, it is intended to cover all modifications and alternate implementations falling within the spirit and scope of the invention. For example, the embodiment of the disclosure should not be limited to tagging Natural language application. Lastly, the embodiments are intended to cover capabilities and concepts whether they be via a loosely coupled set of components or they be converged into one or more integrated components, devices, circuits, and/or software programs.

What is claimed is:

1. A computer implemented method for tagging Natural language application comprising:
   analyzing utterances using one or more rules;
   assigning a tag to the analyzed utterances based on the one or more rules by a tagging server; and
   generating at least a report based on the one or more rules to include a unique utterance for each tag, the unique utterance displayed in a descending order.

2. The method according to claim 1, wherein the analysis of the utterances includes determining a frequency of the utterances.

3. The method according to claim 2, further comprising grouping the utterances by their determined frequency and their assigned tag.

4. The method according to claim 3, wherein the determined frequency represents a number of occurrences in natural language where the utterances share semantic meanings.

5. The method according to claim 1, wherein the one or more rules are prioritized, and each of the utterances is analyzed using the prioritized rules.

6. The method according to claim 1, wherein each rule includes three components comprising matching criteria, tag criteria, and priority assignment criteria.

7. The method according to claim 1, further comprising determining statistics for each assigned tag.

8. The method according to claim 1, further comprising building a semantic interpretation grammar based on the tagged utterances.

9. The method according to claim 1, wherein the utterances are unique to each of the tags.

10. A non-transitory computer readable medium comprising instructions that when executed by a processor, cause the processor to perform:
    analyzing utterances using one or more rules;
    assigning a tag to the analyzed utterances based on the one or more rules by a tagging server; and
    generating at least a report based on the one or more rules to include a unique utterance for each tag, the unique utterance displayed in a descending order.

11. The computer readable medium according to claim 10, wherein the instructions for analysis of the utterances includes determining a frequency of the utterances.

12. The computer readable medium according to claim 11, wherein the instructions further comprise grouping the utterances by their determined frequency and their assigned tag.

13. The computer readable medium according to claim 12, wherein the frequency represents a number of occurrences in natural language where the utterances share semantic meanings.

14. The computer readable medium according to claim 10, wherein the one or more rules are prioritized, and each of the utterances is analyzed using the prioritized rules.

15. The computer readable medium according to claim 10, further comprising instructions for creating a semantic interpretation grammar based upon the tagged utterance.

16. The computer readable medium according to claim 10, further comprising instructions for determining statistics for each assigned tag.

17. The computer readable medium according to claim 10, wherein the utterances are unique to each of the tags.

18. A system for tagging Natural language application comprising:
   a memory; and
   a processor communicably coupled to the memory, wherein the processor:
   analyzes utterances using one or more rules;
   assigns a tag to the analyzed utterances based on the one or more rules by a tagging server; and
   generate at least a report based on the one or more rules to include a unique utterance for each tag, the unique utterance displayed in a descending order.

19. The system of claim 18 wherein the processor groups the utterances by their determined frequency and their assigned tag.

20. The system of claim 18 wherein the processor prioritizes the one or more rules and analyzes each of the utterances using the prioritized rules.

* * * * *